United States Patent [19]

Pike et al.

[11] Patent Number: 5,663,252

[45] Date of Patent: Sep. 2, 1997

[54] PROCESS FOR PREPARING A BRANCHED POLYMER FROM A VINYL AROMATIC MONOMER

[75] Inventors: William C. Pike; Duane B. Priddy, both of Midland, Mich.; Peter H. T. Vollenberg, Ghent, Belgium

[73] Assignee: The Dow Chemical Company, Midland, Mich.

[21] Appl. No.: 560,235

[22] Filed: Nov. 21, 1995

[51] Int. Cl.$^6$ .................... C08F 4/34; C08F 2/38

[52] U.S. Cl. .............. 526/216; 526/219; 526/219.1; 526/219.2; 526/219.6; 526/228; 526/230; 526/232; 526/232.5; 526/232.1; 526/232.3; 526/346

[58] Field of Search ............. 526/216, 232.5, 526/228, 219.3, 346, 219, 219.1, 219.2, 219.6, 230, 232, 232.1, 232.3

[56] References Cited

U.S. PATENT DOCUMENTS

| | | |
|---|---|---|
| 2,661,363 | 12/1953 | Dickey. |
| 3,451,981 | 6/1969 | Rekers et al.. |
| 3,451,989 | 6/1969 | Rekers et al.. |
| 4,045,463 | 8/1977 | Matsuyama et al.. |
| 4,376,847 | 3/1983 | Matsubara et al.. |
| 4,520,180 | 5/1985 | Barabas et al. .............. 526/216 X |
| 5,037,915 | 8/1991 | Lundin et al. ................ 526/216 |

FOREIGN PATENT DOCUMENTS

| | | |
|---|---|---|
| 0453158 | 12/1948 | Canada ..................... 526/216 |
| 1720770 | 1/1968 | Germany. |
| 57034102 | 8/1980 | Japan. |
| WO9413705 | 6/1994 | WIPO. |

OTHER PUBLICATIONS

Dpov. Akad. Nauk Ukr. RSR, Ser. B 29(3), 243–7 (1967) (Ukrain) Vysokomol. Soedin, Ser. A 1970, 12(1), 248–51 (Russ).

*Primary Examiner*—Fred Teskin

[57] ABSTRACT

A free radical polymerization process for producing a branched polymer from a vinyl aromatic monomer comprising polymerizing a vinyl aromatic monomer in the presence of a free radical initiator of the formula:

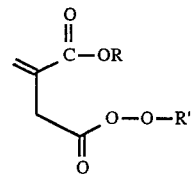

wherein R is H, alkyl, or aralkyl, and R' is alkyl or aryl.

11 Claims, No Drawings

PROCESS FOR PREPARING A BRANCHED POLYMER FROM A VINYL AROMATIC MONOMER

BACKGROUND OF THE INVENTION

This invention relates to a process for preparing a branched polymer from a vinyl aromatic monomer.

Free radical bulk polymerization is a well known process for preparing polymers from vinyl aromatic monomers. However, typical initiators used in these processes produce high viscosity, high molecular weight polymer in the early stages of polymerization, which can lead to gelling. Therefore, these processes are conducted at low temperatures, keeping the polymerization rate and viscosity low such that heat can be removed sufficiently and gelling is prevented.

Branched polymers have been produced from aromatic monomers in a variety of ways including the use of a vinyl functional initiator, such as n-butyl-t-butylperoxyfumarate, as described in U.S. Pat. No. 4,376,847. However, in this method, branching occurs in the polymerization reactor, causing gels to form. Gels build up in the polymerization reactor after extended periods of continuous operation and lead to reactor fouling.

Peritaconates have been used as chain transfer agents to retard the Mw growth in the production of polystyrene, polymethylmethacrylate and polybutylacrylate as described in WO 94/13705 by Nuhuis et al., of Akzo Nobel. Although it is mentioned that these chain transfer agents can also be used as polymerization initiators, the process in Nuhuis et al. produces polymers of low molecular weight, e.g. exemplified as having a Mn of between about 2,200 and 24,000.

Accordingly, it remains highly desirable to provide an efficient method of producing a branched polymer derived from a vinyl aromatic monomer which does not have the foregoing disadvantages of the prior art.

SUMMARY OF THE INVENTION

The present invention is a free radical bulk polymerization process for producing a branched polymer from a vinyl aromatic monomer comprising polymerizing a vinyl aromatic monomer in the presence of a free radical initiator of the formula:

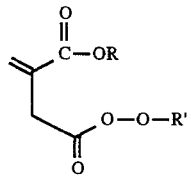

wherein R is H, alkyl, aryl, or aralkyl, wherein aralkyl is defined as an aryl group attached to an alkyl group and the alkyl group is attached to the oxygen, any alkyl group contains 1–6 carbon atoms, and R' is alkyl or aryl wherein aryl is an aromatic group containing 1–3 rings.

This process produces branched polymers, which can have improved properties over linear polymers in extensional rheology, melt strength, and viscosity. These improved properties can lead to processing advantages when compared to linear polymers.

DESCRIPTION OF THE PREFERRED EMBODIMENTS

Vinyl aromatic monomers suitable for use according to the present invention include, but are not limited to, those vinyl aromatic monomers previously known for use in polymerization processes, such as those described in U.S. Pat. Nos. 4,666,987, 4,572,819 and 4,585,825. Preferably, the monomer is of the formula:

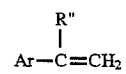

wherein R" is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. In addition, the polymerization may be conducted in the presence of pre-dissolved elastomer to prepare impact modified, or grafted rubber containing products, examples of which are described in U.S. Pat. Nos. 3,123,655, 3,346,520, 3,639,522, and 4,409,369.

The initiator used in the process of the present invention is a peritaconate of the formula:

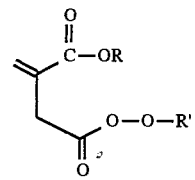

wherein R is H, alkyl, or aralkyl, wherein aralkyl is defined as an aryl group attached to an alkyl group which is also attached to the oxygen, any alkyl group contains 1–6 carbon atoms, and R' is alkyl or aryl wherein aryl is an aromatic group containing 1–3 rings. Preferably, R is H and R' is t-butyl.

The peritaconates used in the process of the present invention are known compounds and can be made by several known methods, including processes taught in WO 94/13705.

The amount of initiator used in the process of the present invention will depend upon the desired Mw of the polymer to be produced. Higher levels of initiator produce lower molecular weight polymers. The initiator is typically present in amounts of from about 10 to about 1500 ppm based on the total weight of starting monomer. Preferably, the initiator is present in amounts from about 100 to about 1400 ppm, more preferably from about 200 to about 1200 ppm, and most preferably from about 300 to about 1000 ppm.

Other initiators may also be present in the process of the present invention in combination with the t-alkylperitaconates described above. Examples of other initiators which may be present include but are not limited to t-butylhydroperoxide, ditertiary-butylperoxide, cumene hydroperoxide, dicumylperoxide, 1,1-bis(tertiary-butylperoxy)-3,3,5-trimethylcyclohexane, t-butylperoxybenzoate, 1,1-bis(t-butylperoxy-)cyclohexane, benzoylperoxide, succinoylperoxide and t-butylperoxypivilate, and azo compounds such as azo bisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the process of the present invention providing that the total amount of initiator will be such that a polymer having at least a Mw of 75,000 is produced.

In addition to initiators, chain transfer agents such as thiols and mercaptans, e.g., n-dodecylmercaptan, may also be used in the process of the present invention.

The process of the present invention can be conducted in the presence of solvent which is inert for the polymeric material being formed. Solvents useful in the process of the present invention include but are not limited to ethyl benzene, benzene, toluene, and the like.

The peritaconate initiator can be added to the vinyl aromatic monomer at any time during the polymerization process. It is typically added to the starting monomer(s) prior to polymerization or in the early stages of polymerization, e.g. up to 50% conversion. Preferably, the initiator is dissolved in a solvent and combined with starting monomer(s) prior to the polymerization reaction.

Polymerization processes and process conditions for the polymerization of vinyl aromatic monomers are well known in the art. Although any polymerization process can be used, typical processes are continuous bulk or solution polymerizations as described in U.S. Pat. No. 2,727,884 and U.S. Pat. No. 3,639,372 which are incorporated herein by reference. The polymerization is typically conducted at temperatures from about 80° to about 170° C., preferably from about 90° to about 160° C., more preferably from about 100° to about 155° C., and most preferably from about 110° to about 150° C.

The polymer produced by the process of the present invention can have a broad range of weight average molecular weight (Mw), ranging from about 75,000 to about 800,000 as measured by gel permeation chromatography (GPC); typically from about 90,000, preferably from about 100,000, more preferably from about 150,000, and most preferably from about 200,000 to about 700,000, preferably to about 600,000, more preferably to about 550,000 and most preferably to about 500,000.

The polymers produced by the process of the present invention can find use in foam board, foam sheet and injection molded and extruded products.

The following examples are provided to illustrate the present invention. The examples are not intended to limit the scope of the present invention and they should not be so interpreted. Amounts are in weight parts or weight percentages unless otherwise indicated. The polymer weight average molecular weight (Mw) is determined using gel permeation chromatography (GPC) and refers to the Mw of the solids. Number average molecular weight (Fin) and (Mz) are also determined using (GPC).

EXAMPLE 1

Stock solutions are prepared by dissolving 0.0966 g of t-butylperoxybenzoate (tBPB) and 0.0815 g of benzoyl peroxide (BPO) in 210 g of styrene (Sol. 1), 0.0179 g of t-butylperitaconate (tBPIT) in 79.5 g of Sol. 1 (Sol. 2), 0.0355 g of tBPIT in 75.7 g of Sol. 1 (Sol. 3), and 0.0788 g of tBPIT in 101.9 g of styrene (Sol. 4) Approximately 2–3 mls of each solution are placed in two ampoules (12×0.4 in. OD) (0.11 in. wall thickness). The ampoules are sealed under vacuum using the freeze-thaw technique and heated in an oil bath at 90° C. for 1 hour, followed by raping to 140° C. at a rate of 1° C./minute and holding at 140° C. for 1 hour. The polymer is removed from the ampoule at the appropriate time during the heating treatment as detailed in Table 1 and evaluated. The time listed in Table 1 refers to the time from the beginning of the initial heating at 90° C. Results are listed in Table 1.

TABLE 1

| Sample | BPO (ppm) | tBPB (ppm) | tBPIT (ppm) | % Solids/Time (h) | Mw/1000 | Mn/1000 | Mz/1000 | Mw/Mn |
| --- | --- | --- | --- | --- | --- | --- | --- | --- |
| Sol. 1* | 388 | 460 | 0 | 16.4/1.5 | 188 | 75 | 314 | 2.5 |
| Sol. 1* | 388 | 460 | 0 | 75.6/2.88 | 227 | 112 | 360 | 2.0 |
| Sol. 2 | 388 | 460 | 225 | 16.3/1.5 | 193 | 76 | 330 | 2.5 |
| Sol. 2 | 388 | 460 | 225 | 80.4/2.88 | 243 | 115 | 401 | 2.1 |
| Sol. 3 | 388 | 460 | 469 | 19.9/1.5 | 187 | 69 | 331 | 2.7 |
| Sol. 3 | 388 | 460 | 469 | 86.3/2.88 | 253 | 114 | 428 | 2.2 |
| Sol. 4 | 0 | 0 | 773 | 12.8/1.5 | 297 | 94 | 511 | 3.2 |
| Sol. 4 | 0 | 0 | 773 | 88.6/2.88 | 346 | 146 | 587 | 2.4 |

*Comparative Example

Mw, Mz and polydispersity all increase by the addition of tBPIT to the feed, when compared with the results obtained with BPO and tBPB alone.

EXAMPLE 2

Ampoule samples are Prepared as in Example 1 using tBPIT and t-butylperoxy-n-butylfumarate (BPBF) (Comparative example) as initiators and are subjected to the following heat treatment: placing in an oil bath at 90° C. and ramping to 140° C. at 10° C./hour. The polymer is removed from the ampoule at the appropriate time during the heating treatment as detailed in Table 2 and evaluated for Mw, percent solids etc. The time listed in Table 2 refers to the time from initial heating at 90° C. Results are listed in Table 2.

TABLE 2

| Tube # | Init/ppm | Time (h) | % Solids | Mw/1000 | Mn/1000 | Mz/1000 | Mw/Mn |
|---|---|---|---|---|---|---|---|
| 1 | BPBF/200 | 1 | 3.4 | 625 | 302 | 1067 | 2.1 |
| 2 | BPBF/200 | 2 | 10.3 | 634 | 256 | 1219 | 2.5 |
| 3 | BPBF/200 | 3 | 23.3 | 612 | 237 | 1215 | 2.6 |
| 4 | BPBF/200 | 4 | 40.7 | 551 | 212 | 1114 | 2.6 |
| 5 | BPBF/200 | 5 | 59.6 | 490 | 187 | 992 | 2.6 |
| 6 | BPBF/400 | 1 | 4.1 | 564 | 250 | 1019 | 2.3 |
| 7 | BPBF/400 | 2 | 13.8 | 689 | 236 | 1470 | 2.9 |
| 8 | BPBF/400 | 3 | 31.3 | 700 | 220 | 1506 | 3.2 |
| 9 | BPBF/400 | 4 | 47.6 | 653 | 220 | 1460 | 3.0 |
| 10 | BPBF/400 | 5 | 67 | 567 | 208 | 1234 | 2.7 |
| 11 | BPBF/800 | 1 | 5.6 | 454 | 190 | 868 | 2.4 |
| 12 | BPBF/800 | 2 | 20.5 | 711 | 196 | 1671 | 3.6 |
| 13 | BPBF/800 | 3 | 42.8 | 843 | 206 | 2060 | 4.1 |
| 14 | BPBF/800 | 4 | 62.2 | 799 | 218 | 1910 | 3.7 |
| 15 | BPBF/800 | 5 | 87.6 | 731 | 207 | 1790 | 3.5 |
| 16 | BPIT/166 | 1 | 5.5 | 484 | 263 | 746 | 1.8 |
| 17 | BPIT/166 | 2 | 13.5 | 437 | 228 | 687 | 1.9 |
| 18 | BPIT/166 | 3 | 24.9 | 435 | 218 | 710 | 2.0 |
| 19 | BPIT/166 | 4 | 38.9 | 452 | 217 | 758 | 2.1 |
| 20 | BPIT/166 | 5 | 59.8 | 442 | 209 | 764 | 2.2 |
| 21 | BPIT/331 | 1 | 7.3 | 397 | 212 | 625 | 1.9 |
| 22 | BPIT/331 | 2 | 17.1 | 377 | 198 | 601 | 1.9 |
| 23 | BPIT/331 | 3 | 30 | 397 | 197 | 663 | 2.0 |
| 24 | BPIT/331 | 4 | 47.2 | 462 | 211 | 803 | 2.2 |
| 25 | BPIT/331 | 5 | 69.1 | 469 | 206 | 840 | 2.3 |
| 26 | BPIT/662 | 1 | 9.6 | 314 | 169 | 498 | 1.9 |
| 27 | BPIT/662 | 2 | 21.6 | 323 | 167 | 523 | 1.9 |
| 28 | BPIT/662 | 3 | 38.3 | 388 | 181 | 668 | 2.1 |
| 29 | BPIT/662 | 4 | 59.8 | 487 | 209 | 892 | 2.3 |
| 30 | BPIT/662 | 5 | 91.7 | 529 | 209 | 995 | 2.5 |

Mw continues to build when using BPIT whereas Mw drops off after about 40% conversion when using BPBF.

EXAMPLE 3

Styrene (1350 g), ethylbenzene (150 g) and an initiator are placed in a 1500 milliliter (mL) reactor which is described in FIG. 1 of U.S. Pat. No. 4,239,863. The initiators are 1,1-bis(t-butylperoxy)cyclohexane (BBPC)(300 ppm), t-butyl peroxybenzoate (tBPB) (500 ppm), 2,2-bis-(4,4-di(t-butylperoxy) cyclohexyl)propane (PK12)(300 ppm), and t-butylperitaconate (tBPIT)(500 ppm). The mixture is heated to 100° C. over 50 min and then to 150° C. at a rate of 10° C./hour. Samples are drawn periodically from the polymerization and analyzed for percent polystyrene and weight average molecular weight using GPC. Results are shown in Table 3.

TABLE 3

| Time (hrs) | BBPC* % conv | BBPC* Mw/1000 | tBPB *% conv | tBPB* Mw/1000 | PK12* % conv | PK12* Mw/1000 | tBPIT % conv | tBPIT Mw/1000 |
|---|---|---|---|---|---|---|---|---|
| 1 | 10 | 262 | 13 | 321 | 10 | 318 | 15 | 204 |
| 2 | 20 | 242 | 22 | 284 | 22 | 297 | 26 | 256 |
| 3 | 33 | 236 | 35 | 256 | 36 | 298 | 40 | 313 |
| 4 | 59 | 251 | 60 | 230 | 58 | 317 | 60 | 327 |
| 5 | 67 | 247 | 70 | 225 | 69 | 301 | 70 | 319 |

% conv = percent conversion
*comparative example

The results show that high Mw polymer is produced in the early stages of polymerization when using BBPC, tBPB or PK12 initiators. Lower Mw polymer is made in the early stages when using tBPIT with Mw building with increasing conversion.

What is claimed is:

1. A free radical polymerization process for producing a branched polymer having a Mw of at least 75,000 from a vinyl aromatic monomer, comprising polymerizing a vinyl aromatic monomer in the presence of a peritaconate free radical initiator of the formula:

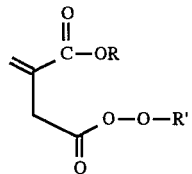

wherein R is H, alkyl, aryl, or aralkyl; and R' is alkyl or aryl.

2. The process of claim 1 wherein the free radical initiator is t-butylperitaconate.

3. The process of claim 2 wherein the t-butylperitaconate is present in an amount of from about 10 to about 1500 ppm based on the total weight of the starting monomer.

4. The process of claim 1 wherein the polymerization is conducted at a temperature from about 80° to about 170° C.

5. The process of claim 1 wherein the branched polymer produced has a Mw of at least 90,000.

6. The process of claim 1 wherein at least one other free radical initiator is present in addition to the peritaconate initiator.

7. The process of claim 6 wherein the other free radical initiator is selected from the group consisting of t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)cyclohexane, benzoylperoxide, succinoylperoxide, t-butylperoxypivilate, azo bisisobutyro-nitrile, azobis-2,4-dimethylvaleronitrile, azobiscyclohexanecarbo-nitrile, azobismethyl isolactate and azobiscyanovalerate or mixtures thereof.

8. The process of claim 7 wherein the other free radical initiator is selected from the group consisting of t-butylperoxybenzoate, benzoyl peroxide, or a mixture thereof.

9. The process of claim 1 wherein the vinyl aromatic monomer is polymerized in the presence of a chain transfer agent.

10. The process of claim 9 wherein the chain transfer agent is a mercaptan or a thiol compound.

11. The process of claim 10 wherein the chain transfer agent in n-dodecylmercaptan.

* * * * *